(12) United States Patent
Yin et al.

(10) Patent No.: US 10,693,338 B2
(45) Date of Patent: Jun. 23, 2020

(54) SYSTEM AND METHOD FOR SUPPRESSING SURFACE DISCHARGES ON CONDUCTIVE WINDINGS OF AN ELECTRIC MACHINE

(71) Applicant: General Electric Company, Schenectady, NY (US)

(72) Inventors: Weijun Yin, Niskayuna, NY (US); Lili Zhang, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 95 days.

(21) Appl. No.: 15/933,398

(22) Filed: Mar. 23, 2018

(65) Prior Publication Data
US 2019/0296599 A1    Sep. 26, 2019

(51) Int. Cl.
| H02K 3/40 | (2006.01) |
| H02K 3/30 | (2006.01) |
| H02K 15/10 | (2006.01) |
| H02K 3/34 | (2006.01) |

(52) U.S. Cl.
CPC ............... *H02K 3/40* (2013.01); *H02K 3/30* (2013.01); *H02K 3/345* (2013.01); *H02K 15/105* (2013.01)

(58) Field of Classification Search
CPC .............. H02K 3/00; H02K 3/32; H02K 3/40
See application file for complete search history.

(56) References Cited

U.S. PATENT DOCUMENTS 3,679,925 A * 7/1972 Fort .................. H02K 3/40
                                                 310/196
6,242,825 B1   6/2001 Mori et al.
6,780,457 B2   8/2004 Baumann et al.
6,798,107 B2   9/2004 Leijon
6,969,940 B2 * 11/2005 Dalrymple ............. H02K 3/345
                                                 174/110 N
8,754,562 B2   6/2014 Platon et al.
2005/0088053 A1   4/2005 Kogan
(Continued)

FOREIGN PATENT DOCUMENTS

JP    2005341706 A    12/2005

OTHER PUBLICATIONS

Chauhan et al., "Rotating Machine Insulation Materials and Techniques",Indian Journal of Engineering & Material Science, vol. 07, pp. 370-374, Oct.-Dec. 2000.
(Continued)

*Primary Examiner* — Tran N Nguyen
(74) *Attorney, Agent, or Firm* — Fletcher Yoder, P.C.

(57) ABSTRACT

A stator assembly of an electric machine includes a stator core having a slot extending between a first end and a second end, where the slot includes a first slot exit at the first end and a second slot exit at the second end. Also, the stator assembly includes a plurality of windings, where one of the plurality of windings is disposed in the slot and extends from the first slot exit to the second slot exit, and where the plurality of windings includes at least one conductor and an insulation disposed around the at least one conductor. Further, the stator assembly includes a dielectric plate coupled to one of the first slot exit and the second slot exit and configured to suppress surface discharges on windings present at one of the first slot exit and the second slot exit to which the dielectric plate is coupled.

16 Claims, 5 Drawing Sheets

(56) References Cited

U.S. PATENT DOCUMENTS

2011/0062816 A1   3/2011   Emery
2011/0072641 A1   3/2011   Baumann

OTHER PUBLICATIONS

Kurimsky et al., "Understanding surface partial discharges in HV coils and the role of semi-conductive protection", Electrical Engineering, vol. 92, Issue No. 7, pp. 283-289, Dec. 2010.
Application No. 19163877.4; EP Search Report dated Jul. 9, 2019; 6 pages.

* cited by examiner

SYSTEM AND METHOD FOR SUPPRESSING SURFACE DISCHARGES ON CONDUCTIVE WINDINGS OF AN ELECTRIC MACHINE

BACKGROUND

Embodiments of the present specification relate generally to electric machines, and more particularly to a system and method for suppressing surface discharges on conductive windings of the electric machines.

Typically, an electric machine is representative of an electric motor that converts electric power to mechanical power or to an electric generator that converts mechanical power to electric power. In general, the electric machine includes a rotor, a stator, and windings. It may be noted that the windings are representative of electrically insulated conductors made into coils of many turns. The stator includes a plurality of radial slots in which the windings are positioned. In an example of the electric machine acting as the electric motor, electric current flows through these windings and produces an electric field that aids in rotating the rotor in the electric machine. As a result, the rotor produces mechanical power and provides this mechanical power to a load that is coupled to the electric machine.

In an aviation application, the electric machine may be operated at a higher altitude, for example 50,000 feet above the sea level, having low atmospheric pressure. However, at this low atmospheric pressure, the electric machine may have low air breakdown voltage, which causes surface discharges on the windings and may degrade insulation of the windings. Also, as the need for electric aircrafts and hybrid electric propulsion systems is increasing, high voltage devices are emerging, which requires the electric machine to be designed and operated at high voltages, such as +/−270V or +/−540V. However, operating the electric machine at such a high voltage and low atmospheric pressure may increase the electric field around the windings and may cause air breakdown in the electric machine. Moreover, if the electric machine is operated at a high voltage (e.g., +/−270V) and driven by power electronic converters such as insulated-gate bipolar transistor (IGBT) and silicon carbide (SiC) drives, a significant voltage shoots to the windings due to a fast rise time. As a consequence, surface discharge may occur on the windings at an exit of the radial slots of the stator and may degrade the insulation of the windings. This degradation of the insulation may in-turn cause failure of the electric machine.

In general, electric machines used in an aviation system are required to be light weight and have high-power density to save fuel in the system. Therefore, to reduce the weight of the electric machines, thin insulation is preferred around the windings in the electric machine. However, for high reliability and safety, the electric machines are required to be free from a partial discharge. In conventional medium voltage industrial line-fed electric machines, partial discharge resistant mica tape is used for insulating the windings. More specifically, the windings are wrapped with corona protection tape in the slots and stress grading tape outside the slots to minimize the electric field and prevent occurrence of surface discharges on the windings. However, for the electric machines driven by power electronic converters such as insulated-gate bipolar transistor (IGBT) and SiC drives, the electric field will be concentrated at the slot exit. The corona protection tape and the stress grading tape may not have sufficient thickness or layers to move this increased electric field away from the slot exit of the stator core, hence fail to prevent the occurrence of surface discharges on the windings. Moreover, if the thickness of these conductive tapes is increased, more heat will be generated around the windings, which in-turn damages the insulation of the windings.

Thus, there is a need for an improved system and method for suppressing surface discharges on the windings of the electric machine.

BRIEF DESCRIPTION

In accordance with aspects of the present specification, a stator assembly of an electric machine is presented. The stator assembly includes a stator core including a slot extending between a first end and a second end of the stator core, where the slot includes a first slot exit at the first end and a second slot exit at the second end of the stator core. Also, the stator assembly includes a plurality of windings, where one of the plurality of windings is disposed in the slot and extends from the first slot exit to the second slot exit, and where the plurality of windings includes at least one conductor and an insulation disposed around the at least one conductor. Further, the stator assembly includes a dielectric plate coupled to one of the first slot exit and the second slot exit and configured to suppress surface discharges on windings present at one of the first slot exit and the second slot exit to which the dielectric plate is coupled.

In accordance with another aspect of the present specification, a method for suppressing surface discharges on a plurality of windings of a stator assembly is presented. The method includes disposing one of the plurality of windings in a slot in a stator core of the stator assembly such that the plurality of windings extends from a first end to a second end of the stator core, where the slot includes a first slot exit at the first end and a second slot exit at the second end of the stator core, and where the plurality of windings includes at least one conductor and an insulation disposed around the at least one conductor. Also, the method includes coupling a dielectric plate to one of the first slot exit and the second slot exit, where the dielectric plate is configured to suppress surface discharges on the windings present at one of the first slot exit and the second slot exit to which the dielectric plate is coupled.

In accordance with yet another aspect of the present specification, an electric machine is presented. The electric machine includes a housing, a rotor assembly, and a stator assembly. Further, the stator assembly includes a stator core including a slot extending between a first end and a second end of the stator core, where the slot includes a first slot exit at the first end and a second slot exit at the second end of the stator core. Also, the stator assembly includes a plurality of windings, where one of the plurality of windings is disposed in the slot and extends from the first slot exit to the second slot exit, and where the plurality of windings includes at least one conductor and an insulation disposed around the at least one conductor. In addition, the stator assembly includes a dielectric plate coupled to one of the first slot exit and the second slot exit and configured to suppress surface discharges on windings present at one of the first slot exit and the second slot exit to which the dielectric plate is coupled.

DRAWINGS

These and other features, aspects, and advantages of the present disclosure will become better understood when the following detailed description is read regarding the accompanying drawings in which like characters represent like parts throughout the drawings, wherein.

DETAILED DESCRIPTION

As will be described in detail hereinafter, various embodiments of systems and methods for suppressing surface discharges on a plurality of windings of a stator assembly are presented. The systems and methods presented herein employ a dielectric plate at a slot exit of the stator assembly to reduce a strength of an electric field and suppress surface discharges on the windings. By suppressing the surface discharges on the windings, degradation of insulation of the conductive winding may be prevented or mitigated, which in-turn may prevent failure of an electric machine.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while considering that in some circumstances, the modified term may sometimes not be appropriate, capable, or suitable.

In some embodiments, a stator assembly of an electric machine is presented. The stator assembly includes a stator core including a slot extending between a first end and a second end of the stator core, where the slot includes a first slot exit at the first end and a second slot exit at the second end of the stator core. Also, the stator assembly includes a plurality of windings disposed in the slot and extending from the first slot exit to the second slot exit, where the windings include at least one conductor and an insulation disposed around the at least one conductor. Further, the stator assembly includes a dielectric plate coupled to at least one of the first slot exit and the second slot exit and configured to suppress surface discharges on the windings present at a corresponding slot exit.

Figure 1:
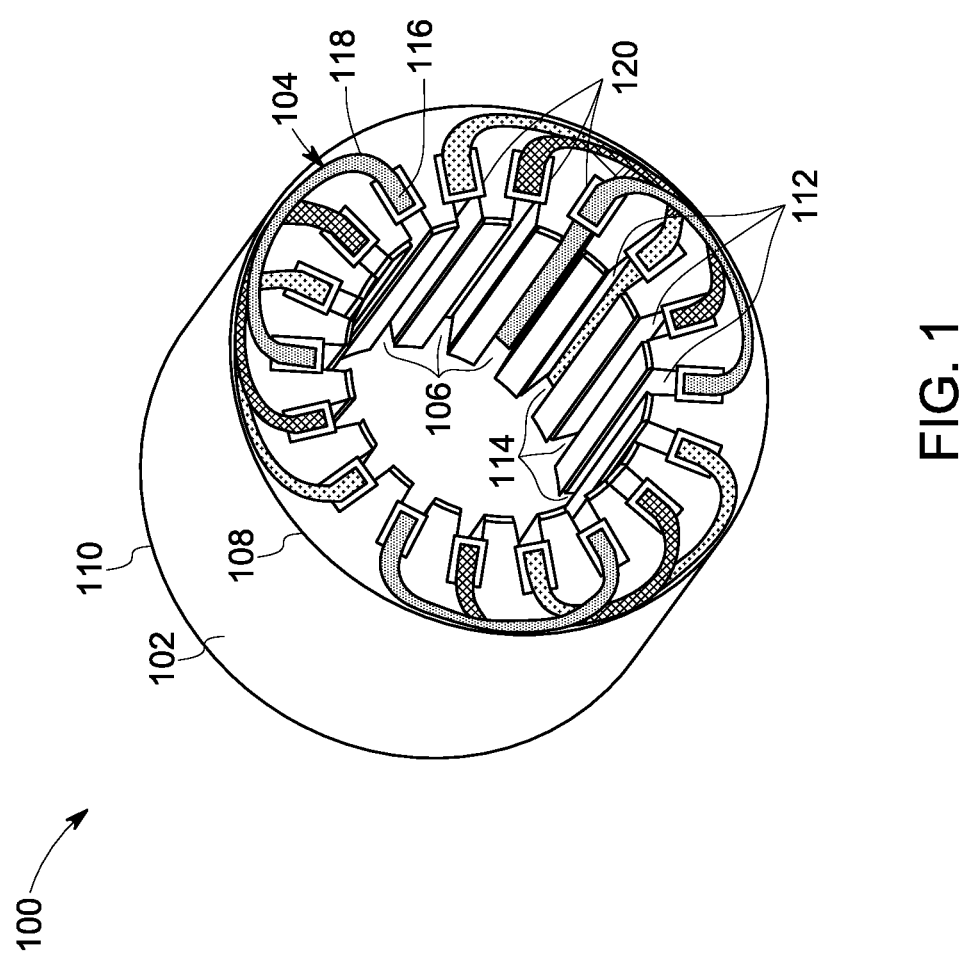
FIG. 1 is a diagrammatical representation of a stator assembly of an electric machine, in accordance with aspects of the present specification.

Turning now to the drawings and referring to FIG. 1, a diagrammatical representation of a stator assembly 100 of an electric machine, in accordance with aspects of the present specification, is depicted. The electric machine (shown in FIG. 4) may be used in one or more applications for converting electric power to mechanical power or mechanical power to electric power. In an aviation application, the electric machine may be used in electric aircrafts or hybrid electric propulsion systems. Also, the electric machine for use in aviation applications is designed and operated at a voltage that is above a threshold voltage value. In one example, the threshold voltage value may be in a range from about 240 V to about 1.7 kV. In addition, the electric machine is capable of functioning at an altitude that has a pressure below a threshold pressure value. In one example, the threshold pressure value may be in a range from about 14.5 psi to about 1 psi. In another example, the altitude may be about 50,000 feet above the sea level. It may be noted that the electric machine may include other components, such as a rotor assembly and a shaft, and is not limited to the stator assembly 100.

In a presently contemplated configuration, the stator assembly 100 is fixedly mounted relative to a rotor assembly (shown in FIG. 4) within a housing of the electric machine. Also, the stator assembly 100 includes a stator core 102 and a plurality of windings 104. It may be noted that the windings are representative of electrically insulated conductors made into coils of many turns. The stator core 102 may be an annular structure with a large central opening. In one example, the annular structure may be formed from a magnetic material. Further, the stator core 102 includes a plurality of slots 106 that extend between a first end 108 and a second end 110 of the stator core 102. In one embodiment, these slots 106 may be arranged axially over an inner periphery of the annular structure of the stator core 102. In addition, each of these slots 106 includes a first slot exit 112 at the first end 108 and a second slot exit 114 at the second end 110 of the stator core 102. It may be noted that the length, number, and position of the slots 106 may vary depending upon number of poles in the electric machine, power rating of the electric machine, number of phases, and so forth.

Furthermore, the windings 104 are disposed in these slots 106 of the stator core 102 and extend from the first slot exit 112 to the second slot exit 114. In one embodiment, the windings 104 may be laced through the slots 106 to form a winding pattern or configuration in the stator core 102. In another embodiment, the windings 104 in one slot 106 may be interconnected with the windings 104 in another slot 106 to form a winding pattern or configuration in the stator core 102. Also, the windings 104 may form interfaces with the stator core 102 and air at the first slot exit 112 and the second slot exit 114. It may be noted that a point of interface of the windings 104, the stator core 102, and air is referred to as a first interface point (see FIG. 2).

As depicted in FIG. 1, the windings 104 may include one or more conductors 116 and an insulation 118 disposed around the conductors 116. The conductors 116 are used for conducting electric current, while the insulation 118 is used for insulating the conductors 116 or high voltage conductors from other potentials. In one example, each conductor 116 may include a plurality of conductive coil strands that is wrapped by the insulation 118. Further, the insulation 118 may be designed to isolate the conductors 116 from the stator core 102. Also, the insulation 118 may be used to isolate a conductor 116 in one slot 106 from a conductor 116 in another slot 106 of the stator core 102. It may be noted that various slot geometries, winding patterns, and combination of windings within the slots may be employed depending upon the electric machine design. In general, the windings 104 may have leads that extend through a single end of the stator core 102 or both ends of the stator core 102. Also, these leads may be laced and/or interconnected to form groups and phases of the stator assembly 100. The interconnections may thus allow for a multi-phase operation, while providing a desired number of poles and a suitable winding configuration for the stator assembly 100.

Figure 2:
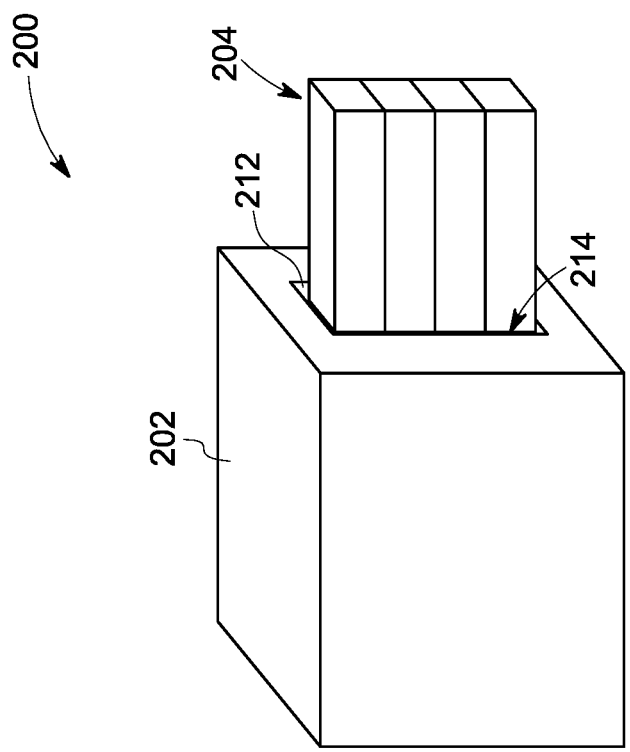
FIG. 2 illustrates a portion of windings extending from a slot exit of a stator core in a typical stator assembly that does not include a dielectric plate.

FIG. 2 illustrates a portion 200 of a typical stator assembly that does not include a dielectric plate. In particular, the portion 200 of the typical stator assembly depicts windings 204 that extend from a slot exit 212 of a stator core 202, in the typical stator assembly. The windings 204 extend through the slot exit 212 at one end of the stator core 202. Also, at the slot exit 212, the windings 204 form an interface with the stator core 202 and air. A point of interface of the windings 204, the stator core 202, and air is referred to as a first interface point 214.

In general, when the electric current flows through the windings 204 in the stator core 202, an electric field is produced around the windings 204. However, if the electric machine is operated at a voltage above a threshold voltage value and a pressure below a threshold pressure value, the electric field is substantially increased at the slot exit 212 due to a low dielectric constant value of air and a high dielectric constant value of the stator core 202 at the slot exit 212. In some conditions, if the electric machine is operated at the voltage above the threshold voltage value irrespective of the pressure, the electric field may increase at the slot exit 212. This increase in the electric field may cause electrical stress concentration at an area around the slot exit 212, which in-turn causes air breakdown at the slot exit 212. As a result, surface discharge occurs on the windings 204. Further, electron bombardment of the surface discharge may degrade the insulation of the windings 204. This degradation of the insulation may in-turn cause failure of the electric machine. It may be noted that the air breakdown is an event where electric current flows through an electrical insulator when voltage applied across the electrical insulator exceeds a breakdown/threshold voltage. The air breakdown results in the electrical insulator becoming electrically conductive. Further, it may be noted that the surface discharge is a localized dielectric breakdown (DB) of a small portion of a solid electrical insulation under high voltage (HV) stress. The surface discharge can erode solid electrical insulation and eventually lead to breakdown of the solid electrical insulation.

To mitigate these shortcomings in the typical stator assemblies, the example stator assembly 100 includes a dielectric plate configured to suppress surface discharges on windings 104 at one of the slot exits 112, 114 of slots in a stator core. Referring again to FIG. 1, a dielectric plate 120 is provided. The dielectric plate 120 is configured to suppress surface discharges on the windings 104 at one of the slot exits 112, 114 of the slots 106 in the stator core 102 of the stator assembly 100. It may be noted that the dielectric plate 120 is capable of suppressing the surface discharges on the windings 104 even when the stator assembly 100 is operated at a pressure below the threshold pressure value and/or at a voltage above the threshold voltage value. In some embodiments, the stator assembly 100 of FIG. 1 may include a plurality of dielectric plates 120 that is configured to suppress surface discharges on the windings 104 at each slot exit 112, 114 of the slots 106 in the stator core 102. It may be noted that the dielectric plate 120 may be of any geometry or profile that corresponds to the geometry or profile of the slot exits 112, 114.

In a presently contemplated configuration, for each slot 106 in the stator core 102, one dielectric plate of the plurality of dielectric plates 120 is mechanically coupled to a corresponding first slot exit 112 and another dielectric plate of the plurality of dielectric plates 120 is mechanically coupled to a corresponding second slot exit 114. Further, the windings 104 disposed in the slots 106 may extend through these dielectric plates 120 to form a winding pattern in the stator assembly 100. More specifically, the windings 104 at the first end 108 of the stator core 102 extend through the first slot exit 112 and through the dielectric plate 120 coupled to the first slot exit 112. Similarly, the windings 104 at the second end 110 of the stator core 102 extend through the second slot exit 114 and through the dielectric plate 120 coupled to the second slot exit 114.

Furthermore, as the windings 104 are laced through the slots 112, 114 in the stator core 102, the windings 104 may form interfaces with the dielectric plate 120 and air at the first slot exit 112 and the second slot exit 114. It may be noted that a point of interface of the windings 104, the dielectric plate 120, and air is referred to as a second interface point 302 (see FIG. 3).

In one example, the dielectric plates 120 include a corona resistant material selected from the group consisting of a polymer, a mica composite, and a polymer nanocomposite. Also, each dielectric plate 120 has a dielectric constant value that is lower than or proximate to a dielectric constant value of the insulation of the windings 104. In one example, the dielectric constant value of the dielectric plate 120 is in a range from about 4 to about 2. Moreover, each dielectric plate 120 has a predetermined thickness and a predetermined height that aid in reducing the electric field strength on a surface of the windings 104 to a value that is lower than an air breakdown strength. It may be noted that the air breakdown strength is representative of an electric field that causes air to partially ionize and begin conducting. The predetermined thickness may be in a range from about 5 mm to about 20 mm. Similarly, the predetermined height may be in a range from about 10 mm to about 30 mm.

In one embodiment, the dielectric plate 120 may have a predetermined dielectric constant value, the predetermined thickness, and the predetermined height to provide optimum insulation or suppression of the surface discharges at the slot exit 112. In one example, the predetermined dielectric constant value of the dielectric plate 120 may be in a range from about 4 to about 2 to reduce the electric field by a value that is in a range from about 93% to about 97%.

Figure 3:
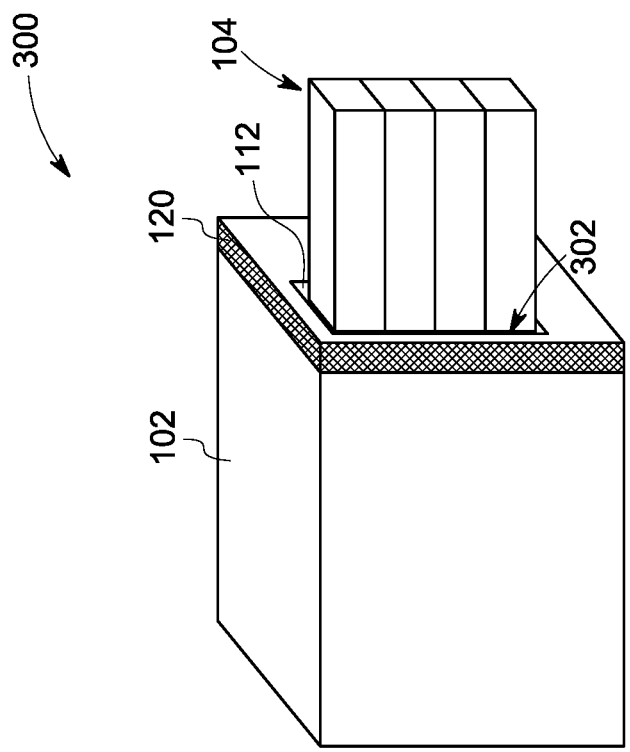
FIG. 3 illustrates a portion of windings extending from a slot exit of a stator core and through a dielectric plate, in accordance with aspects of the present specification.

FIG. 3 is a diagrammatical representation 300 of a portion of the stator assembly 100 of FIG. 1. Also, FIG. 3 is described with reference to the components of FIG. 1. In particular, FIG. 3 depicts the portion 300 of the windings 104 that extend from the slot exit 112 of the stator core 102 and through the dielectric plate 120, in accordance with aspects of the present specification. In the embodiment of FIG. 3, the dielectric plate 120 is mechanically coupled to the slot exit 112. Also, the windings 104 extend through the slot exit 112 at one end of the stator core 102 and through the dielectric plate 120 that is coupled to the slot exit 112. Also, at the slot exit 112, the windings 104 interface with the dielectric plate 120 and air. The point of interface of the windings 104, the dielectric plate 120, and air is referred to as a second interface point 302.

During operation of an electric machine, electric current flows through the windings that are disposed in the stator core 102. Further, the electric current in the windings 104 produces electric field around the windings 104. Use of the dielectric plate 120 at the slot exit 112, 114, aids in reducing the strength of the electric field at the slot exit 112, 114 to a value below the air breakdown strength. In one example, the strength of the electric field may be reduced to a value lower than 240 V/mm, which is about 40% lower than the strength of the electric field at the sea level. Also, the electrical stress concentration at a first area around the first interface point 214 of FIG. 2 of the windings 104, the stator core 102, and air is shifted to a second area around the second interface point 302 of FIG. 3 of the windings 104, the dielectric plate 120, and air.

Further as noted earlier, the dielectric plate 120 has a dielectric constant value that is lower than or proximate to the dielectric constant value of the insulation 118 of the windings 104. As a result, the stress concentration is shifted from the first interface point 214 to the second interface point 302. Also, density of equipotential lines of the electric field at the second interface point 302 is reduced, which in-turn reduces the strength of the electric field and the electrical stress concentration around the second interface point 302. Moreover, this shift in the electrical stress concentration from the first interface point 214 (see FIG. 2) to the second interface point 302 (see FIG. 3) may substantially reduce surface discharges on the windings 104 at the slot exit 112, 114. As a consequence, the degradation of the insulation 118 and the failure of the electric machine may be prevented or mitigated.

Figure 4:
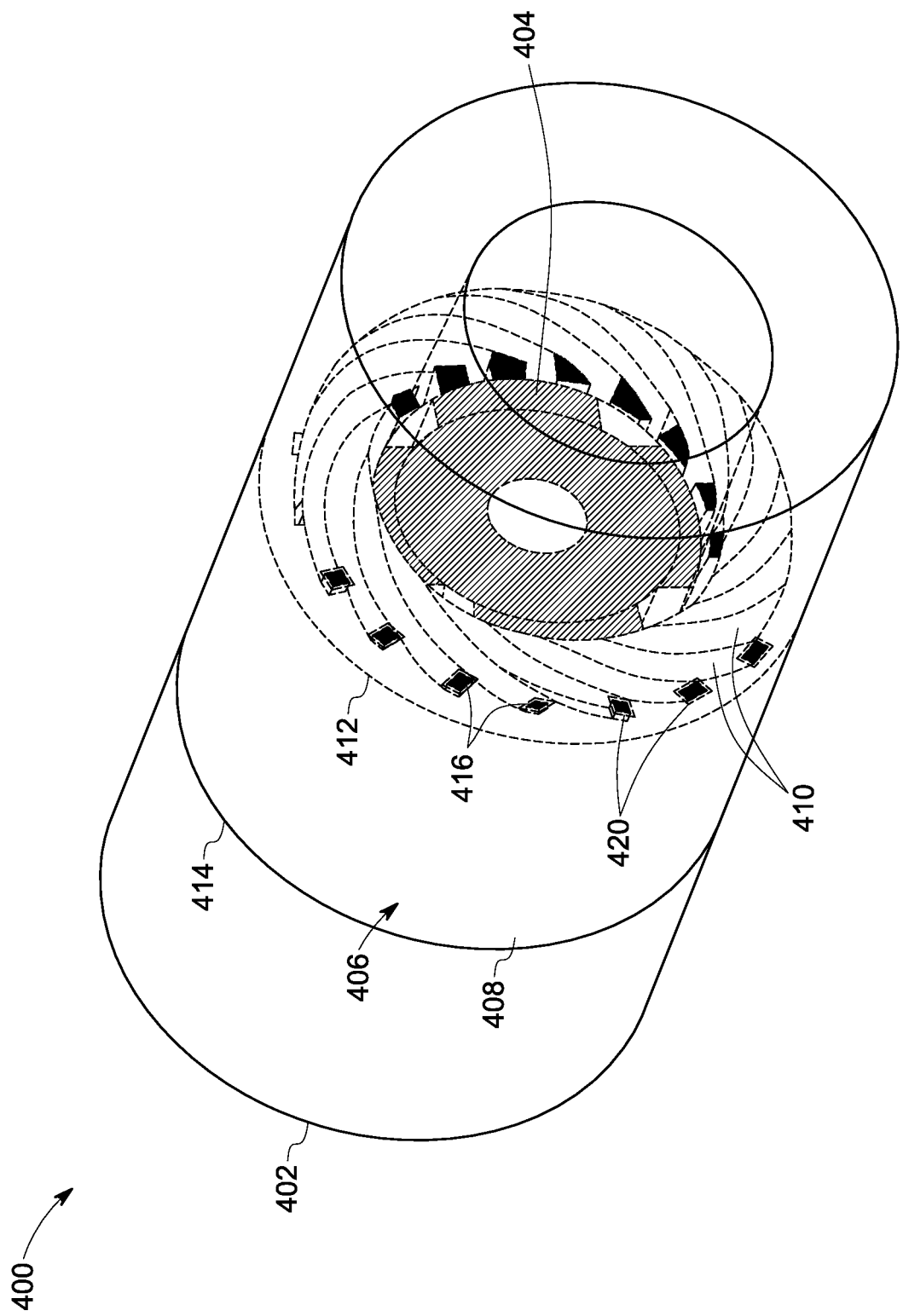
FIG. 4 is a diagrammatical representation of the electric machine, in accordance with aspects of the present specification.

Turning now to FIG. 4, a diagrammatical representation of an electric machine 400, in accordance with aspects of the present specification, is presented. The electric machine 400 may be an electric motor, an electric generator, or an electromagnetic device. The electric motor may be used to convert electric power to mechanical power. In a similar manner, the electric generator may be used to convert mechanical power to electric power. It may be noted that the configuration and design of the electric machine 400 may vary, and is not limited to the configuration shown in FIG. 4.

As depicted in FIG. 4, the electric machine 400 includes a housing 402, a rotor assembly 404, and a stator assembly 406. The stator assembly 406 is similar to the stator assembly 100 of FIG. 1. Further, the rotor assembly 404 is supported within the housing 402 and disposed within a central opening of the stator assembly 406. Also, the rotor assembly 404 is rotatably coupled to the stator assembly 406. If the electric machine 400 is configured as an electric motor, the rotor assembly 404 is configured to rotate within the stator assembly 406 to transfer mechanical power from the electric machine 400 to a load coupled to the electric machine 400. If the electric machine 400 is configured as an electric generator, the rotor assembly 404 is configured to rotate within the stator assembly 406 to induce electric current in the stator assembly 406, which is further transmitted to a load, such as a power grid.

Furthermore, the stator assembly 406 is fixedly mounted relative to the rotor assembly 404 in the housing 402. Also, the stator assembly 406 includes a stator core 408 and a plurality of windings 410. The stator core 408 includes a plurality of slots that is arranged axially over an inner periphery of the annular structure of the stator core 408. Also, these slots extend axially between a first end 412 and a second end 414 of the stator core 408. In addition, each of the slots includes a first slot exit 416 at the first end 412 and a second slot exit at the second end 414 of the stator core 408. Further, the windings 410 are disposed in each of the slots and extend from the first slot exit 416 to the second slot exit. Also, the windings 410 include one or more conductors such as the conductors 116 (see FIG. 1) and an insulation such as the insulation 118 (see FIG. 1) disposed around the conductors.

In addition to the stator core 408 and the windings 410, the stator assembly 406 includes a dielectric plate 420 configured to suppress surface discharges on the windings 410 at one of the slot exits 416 of the slots in the stator core 408. In some embodiments, as illustrated in FIG. 4, the stator assembly 406 includes a plurality of dielectric plates 420 that is configured to suppress surface discharges on the windings 410 at each slot exit 416 of the slots in the stator core 408.

In a presently contemplated configuration, one dielectric plate of the plurality of dielectric plates 420 is coupled to the first slot exit 416 and the second slot exit. In one example, the dielectric plate 420 includes a corona resistant material selected from the group consisting of a polymer, a mica composite, and a polymer nanocomposite. Further, the dielectric plate 420 has a predetermined thickness and a predetermined height. Also, the dielectric plate 420 has a dielectric constant that is less than or proximate to a dielectric constant value of the insulation of the windings 410. As the electric current flows through the windings 410, the dielectric plate 420 reduces the electric field strength at the slot exit 416 below the air breakdown strength. Also, the electrical stress concentration at a first area around a first interface point such as the first interface point 214 (see FIG. 2) of the windings 410, the stator core 408, and air is shifted or moved to a second area around a second interface point such as the second interface point 302 (see FIG. 3) of the windings 410, the dielectric plate 420, and air. By shifting the electrical stress concentration from the first interface point 214 to the second interface point 302, the surface discharges on the windings 410 at the slot exits 416 may be substantially reduced, which in turn prevents or mitigates degradation of the insulation 118 and the failure of the electric machine 400.

Figure 5:
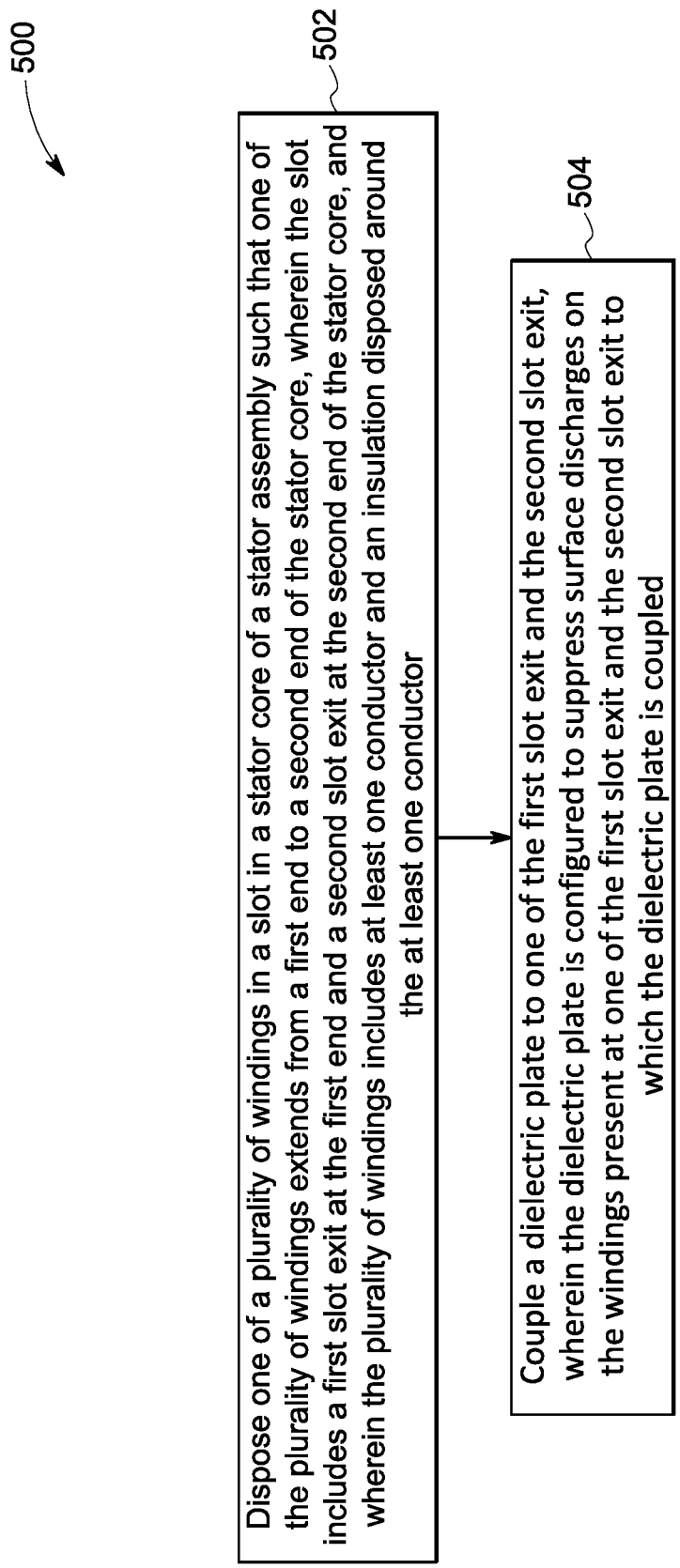
FIG. 5 is a flow chart illustrating a method for suppressing surface discharges on a plurality of windings of a stator assembly, in accordance with aspects of the present specification.

Referring to FIG. 5, a flow chart illustrating a method 500 for suppressing surface discharges on a plurality of windings of a stator assembly, in accordance with aspects of the present specification, is depicted. It may be noted that the windings may be representative of electrically insulated conductors made into coils of many turns. For ease of understanding, the method 500 is described with reference to the components of FIGS. 1-4.

The method 500 includes disposing one of a plurality of windings 104 in the slot 106 in the stator core 102 of the stator assembly 100 such that one of the plurality of windings 104 extends from the first end 108 to the second end 110 of the stator core 102, as shown in step 502. In particular, the stator core 102 includes the plurality of slots 106 that extends between the first end 108 and the second end 110 of the stator core 102. Also, these slots 106 may be arranged axially over an inner periphery of the annular structure of the stator core 102. Moreover, each of the slots 106 includes the first slot exit 112 at the first end 108 and the second slot exit 114 at the second end 110 of the stator core 102. Further, the windings 104 are disposed in these slots 106 of the stator core 102 and extend from the first slot exit 112 to the second slot exit 114. In one example, the windings 104 may be laced through the slots 106 to form a winding pattern or configuration in the stator core 102. Also, the windings 104 include at least one conductor 116 and an insulation 118 that is disposed around the at least one conductor 116.

Subsequently, at step 504, the method 500 includes coupling the dielectric plate 120 to one of the first slot exit 112 and the second slot exit 114. Further, the dielectric plate 120 is configured to suppress surface discharges on the windings 104 present at one of the first slot exit 112 and the second slot exit 114 to which the dielectric plate 120 is coupled. More specifically, the dielectric plate 120 is selected in such a way that the dielectric constant value of the dielectric plate 120 is lower than or proximate to the dielectric constant value of the insulation 118 of the windings 104. Also, the selected dielectric plate 120 has a predetermined thickness and a predetermined height to reduce the electric field strength on a surface of the windings 104 below an air breakdown strength. As a result, density of equipotential lines of an electric field (see FIG. 6) at the second interface point 302 is reduced, which in-turn reduces the strength of the electric field and the electrical stress concentration around the second interface point 302. Moreover, this shift in the electrical stress concentration from the first interface point 214 to the second interface point 302 may substantially reduce surface discharges on the windings 104 at the slot exit 112, 114. As a consequence, the degradation of the insulation 118 and the failure of the electric machine 400 may be prevented or mitigated.

Figure 6:
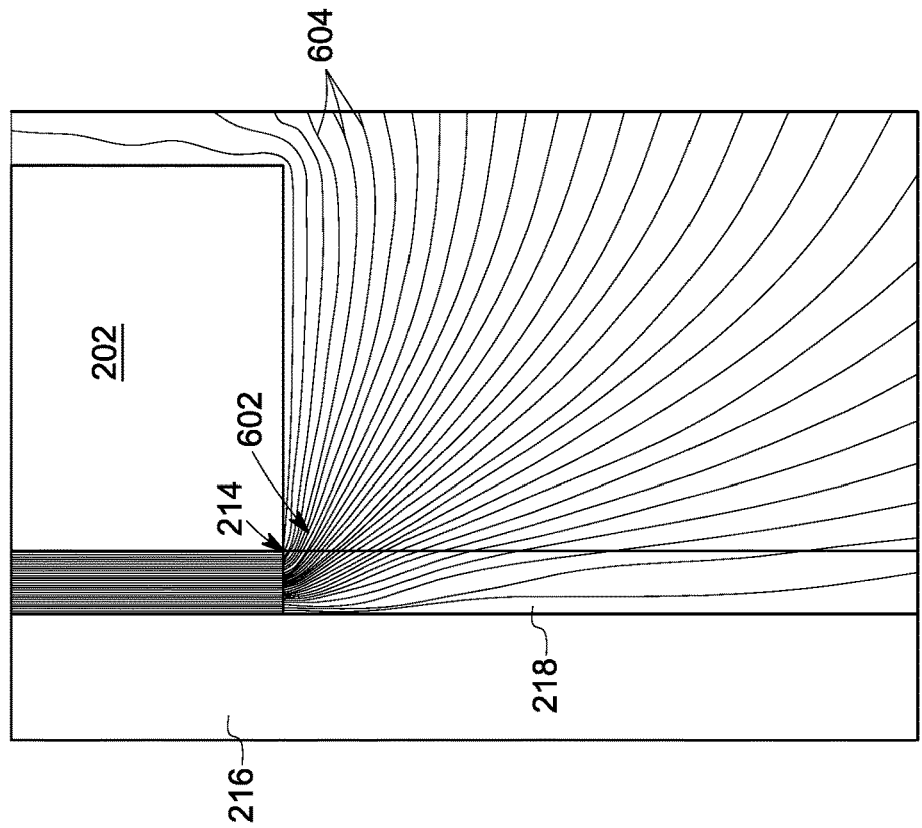
FIG. 6 is a graphical representation of an electric field at a first interface point of a stator assembly, in accordance with aspects of the present specification.

Turning to FIG. 6, a graphical representation 600 of an electric field at a first interface point such as the first interface point 214 (see FIG. 2) of a typical stator assembly that does not include a dielectric plate, is depicted. FIG. 6 is described with reference to FIG. 2. It may be noted that FIG. 6 is a simulation result obtained by using values such as the dielectric constant of the insulation as 4 and the dielectric constant of air as 1. Also, the height of the simulated slot exit is considered as 15 mm and the length of the simulated slot exit is considered as 10 mm for generating the simulation results. The windings 204 exit the stator core 202 at the slot exit 212 and form an interface with air surrounding the slot exit 212. Also, the stator core 202 has a dielectric constant value that is greater than a dielectric constant value of the insulation 218 of the windings 204. As a result, an electric field 602 at the first interface point 214 has a maximum value. Moreover, a distance between equipotential lines 604 of the electric field 602 is small, which indicates that the equipotential lines 604 are denser at the first interface point 214. As a result, the density or strength of the electric field 602 at the first interface point 214 is substantially high. In one example, the strength of the electric field 602 is above 240 V/mm. This increase in the strength of the electric field 602 may cause electrical stress concentration at the first area around the first interface point 214, which in-turn causes air breakdown at the slot exit 212. As a result, surface discharge occurs on the windings 204 and may degrade the insulation 218 of the windings 204.

Figure 7:
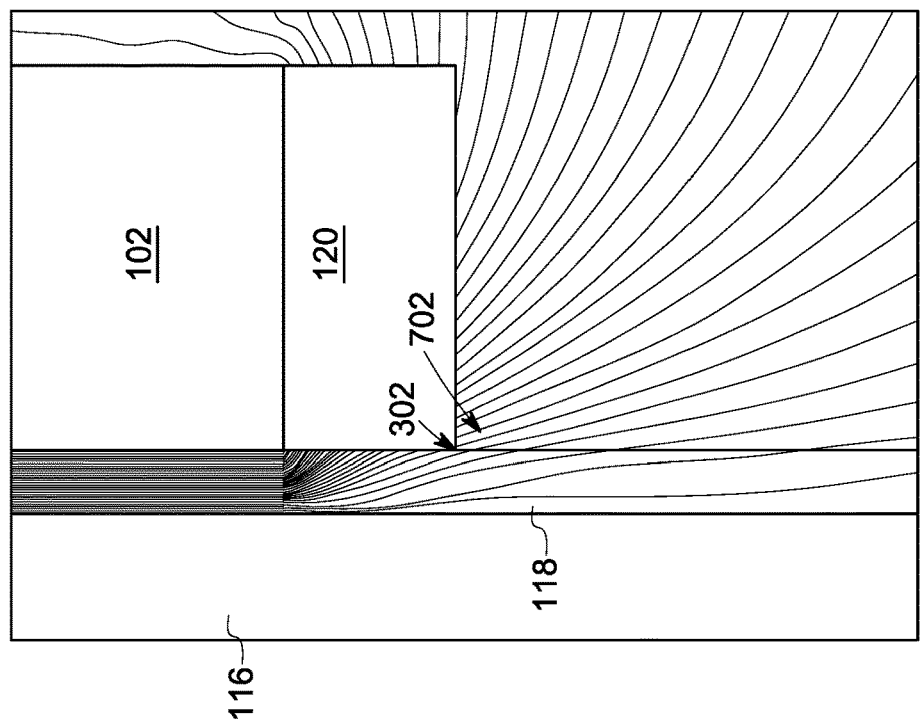
FIG. 7 is a graphical representation of an electric field at a second interface point of a stator assembly, in accordance with aspects of the present specification.

Referring to FIG. 7, a graphical representation 700 of an electric field 702 at the second interface point 302 of the stator assembly 300 of FIG. 3, in accordance with aspects of the present specification, is depicted. It may be noted that FIG. 7 is a simulation result obtained by using values such as a dielectric constant of the insulation as 4 and a dielectric constant of air as 1. Also, the height of the simulated slot exit is considered as 15 mm and the length of the simulated slot exit is considered as 10 mm for generating the simulation results. The windings 104 exit the stator core 102 and the dielectric plate 120 at the slot exit 112 and form an interface with air surrounding the slot exit 112. Also, the dielectric plate 120 has a dielectric constant value that is lower than or proximate to a dielectric constant value of the insulation 118 of the windings 104. As a result, the electric field 702 at the second interface point 302 is significantly reduced compared to the electric field 602 at the first interface point 214 shown in FIG. 6. In one example, the strength of the electric field 702 is below 240 V/mm. This decrease in the strength of the electric field 702 may reduce electrical stress concentration at the second area around the second interface point 302, which in-turn prevents air breakdown at the slot exit 112. As a result, surface discharge and degradation of the windings 104 may be prevented or mitigated.

The various embodiments of the exemplary systems and methods presented hereinabove aid in suppressing surface discharges on a plurality of windings of a stator assembly. By suppressing the surface discharges on the windings, degradation of insulation of the conductive windings may be prevented or mitigated, which in turn may prevent failure of the electric machine. Also, the example systems and methods enable a compact winding in the stator core, which in turn may reduce the weight of the stator assembly and the electric machine. Moreover, with the use of the dielectric plates in the stator assembly, the use of stress grading tapes around the windings may be substantially reduced, which in turn may reduce the manufacturing cost of the stator assembly. In addition, the exemplary systems and methods may enable the electric machine to operate at high altitudes at low pressure and high voltage without degrading the performance of the electric machine.

While only certain features of the present disclosure have been illustrated, and described herein, many modifications and changes will occur to those skilled in the art. It is, therefore, to be understood that the appended claims are intended to cover all such modifications and changes as fall within the true spirit of the present disclosure.

The invention claimed is:

1. A stator assembly of an electric machine, the stator assembly comprising:
   a stator core comprising a slot extending between a first end and a second end of the stator core, wherein the slot comprises a first slot exit at the first end and a second slot exit at the second end of the stator core;
   a plurality of windings, wherein one of the plurality of windings is disposed in the slot and extends from the first slot exit to the second slot exit, and wherein the plurality of windings comprises at least one conductor and an insulation disposed around the at least one conductor; and
   a dielectric plate coupled to one of the first slot exit and the second slot exit and configured to suppress surface discharges on windings present at one of the first slot exit and the second slot exit to which the dielectric plate is coupled, wherein the dielectric plate has a predetermined thickness of between 5 millimeters (mm) and 10 mm and a predetermined height of between 10 mm and 30 mm to reduce an electric field strength on a surface of the windings below an air breakdown strength.

2. The stator assembly of claim 1, wherein the dielectric plate has a dielectric constant value lower than or proximate to a dielectric constant value of the insulation of the plurality of windings.

3. The stator assembly of claim 1, wherein the dielectric plate is configured to shift an electrical stress concentration from a first area around a first interface point of the windings, the stator core, and air to a second area around a second interface point of the windings, the dielectric plate, and air.

4. The stator assembly of claim 1, wherein the dielectric plate comprises a corona resistant material selected from the group consisting of a polymer, a mica composite, and a polymer nanocomposite.

5. The stator assembly of claim 1, wherein the stator core further comprises two or more slots extending axially between the first end and the second end of the stator core, wherein each slot of the two or more slots comprises a first slot exit at the first end and a second slot exit at the second end of the stator core, and wherein each slot of the two or more slots is configured to receive the plurality of windings extending from the first slot exit to the second slot exit.

6. The stator assembly of claim 5, wherein the dielectric plate is coupled to at least one of the first slot exit and the second slot exit of each slot of the two or more slots and configured to suppress the surface discharges on the windings present at the corresponding slot exit.

7. A method for suppressing surface discharges on a plurality of windings of a stator assembly, the method comprising:
  disposing one of the plurality of windings in a slot in a stator core of the stator assembly such that one of the plurality of windings extends from a first end to a second end of the stator core, wherein the slot comprises a first slot exit at the first end and a second slot exit at the second end of the stator core, and wherein the plurality of windings comprises at least one conductor and an insulation disposed around the at least one conductor;
  selecting a dielectric plate having a predetermined thickness of between 5 millimeters (mm) and 10 mm and a predetermined height of between 10 mm and 30 mm to reduce an electric field strength on a surface of the plurality of windings below an air breakdown strength;
  coupling the dielectric plate to one of the first slot exit and the second slot exit, wherein the dielectric plate is configured to suppress surface discharges on the windings present at one of the first slot exit and the second slot exit to which the dielectric plate is coupled; and
  suppressing the surface discharges on the plurality of windings when the stator assembly is operated at a pressure below a threshold pressure value, wherein the threshold pressure is between 1 pounds per square inch (psi) and 14.5 psi, equal to 1 psi, or equal to 14.5 psi.

8. The method of claim 7, further comprising selecting the dielectric plate having a dielectric constant value lower than or proximate to a dielectric constant value of the insulation of the plurality of windings.

9. The method of claim 7, further comprising shifting, by the dielectric plate, an electrical stress concentration from a first area around a first interface point of the plurality of windings, the stator core, and air to a second area around a second interface point of the plurality of windings, the dielectric plate, and air.

10. The method of claim 7, further comprising suppressing the surface discharges on the plurality of windings when the stator assembly is operated at a voltage above a threshold voltage value.

11. An electric machine, comprising:
  a housing;
  a rotor assembly; and
  a stator assembly comprising:
    a stator core comprising a slot extending between a first end and a second end of the stator core, wherein the slot comprises a first slot exit at the first end and a second slot exit at the second end of the stator core;
    a plurality of windings, wherein one of the plurality of windings is disposed in the slot and extending from the first slot exit to the second slot exit, and wherein the plurality of windings comprises at least one conductor and an insulation disposed around the at least one conductor; and
    a dielectric plate coupled to one of the first slot exit and the second slot exit and configured to suppress surface discharges on windings present at one of the first slot exit and the second slot exit to which the dielectric plate is coupled, wherein the dielectric plate has a predetermined thickness of between 5 millimeters (mm) and 10 mm and a predetermined height of between 10 mm and 30 mm to reduce an electric field strength on a surface of the windings below an air breakdown strength.

12. The electric machine of claim 11, wherein the dielectric plate has a dielectric constant value lower than or proximate to a dielectric constant value of the insulation of the plurality of windings.

13. The electric machine of claim 11, wherein the dielectric plate comprises a corona resistant material selected from the group consisting of a polymer, a mica composite, and a polymer nanocomposite.

14. The electric machine of claim 11, wherein the electric machine is one of an electric generator and an electric motor employed in an aircraft electrical propulsion system.

15. The electric machine of claim 11, wherein the rotor assembly is disposed within the housing.

16. The electric machine of claim 11, wherein the stator assembly is fixedly mounted relative to the rotor assembly.

* * * * *